United States Patent [19]
Swerling et al.

[11] Patent Number: 5,582,176
[45] Date of Patent: Dec. 10, 1996

[54] METHODS AND APPARATUS FOR AUTOMATICALLY DETERMINING EDGE FREQUENCY IN DOPPLER ULTRASOUND SIGNALS

[75] Inventors: Peter Swerling, Pacific Palisades; Jon Dovala, Playa del Rey; Nick Okasinski, Cupertino; Andras Boross, Belmont, all of Calif.

[73] Assignee: MedaSonics, Fremont, Calif.

[21] Appl. No.: 515,480

[22] Filed: Aug. 15, 1995

[51] Int. Cl.⁶ .................................................. A61B 8/00
[52] U.S. Cl. ............................... 128/661.09; 73/861.25
[58] Field of Search ....................... 128/661.08, 661.09, 128/661.10, 662.01; 73/861.25; 364/484, 485, 724.01, 724.06, 724.08, 413.25

[56] References Cited

U.S. PATENT DOCUMENTS

| | | | |
|---|---|---|---|
| 4,556,067 | 12/1985 | Hokanson et al. | 128/662.01 |
| 4,967,108 | 10/1990 | Lee et al. | 364/724.01 |
| 5,103,827 | 4/1992 | Smith | 128/661.08 |

OTHER PUBLICATIONS

Medical & Biological Engineering & Computing, entitled "'Objective' Algorithm For Maximum Frequency Estimation In Doppler Spectral Analysers," T. D'Alessio, Jan. 1985, pp. 63–68.

*Primary Examiner*—George Manuel
*Attorney, Agent, or Firm*—Wilson, Sonsini, Goodrich & Rosati

[57] ABSTRACT

Doppler Ultrasound techniques have been used for many years to measure the flow rate of fluids. One of the challenges in using these techniques is to separate fluid flow signal from background noise. The present invention is directed to methods and apparatus for automatically distinguishing fluid flow signal from noise. It is found that noise in Doppler ultrasound techniques has characteristic of a white Gaussian spectral distribution and the mean noise can be characterized as a constant. The present invention involves measuring ultrasonic signals, generating sets of discrete spectral components from these signals, and statistically determining a maximum likelihood estimation from the spectral components. This estimation is used to calculate the fluid velocity.

23 Claims, 6 Drawing Sheets

METHODS AND APPARATUS FOR AUTOMATICALLY DETERMINING EDGE FREQUENCY IN DOPPLER ULTRASOUND SIGNALS

FIELD OF THE INVENTION

The present invention relates to a method and an apparatus for measuring fluid flow using Doppler ultrasound techniques in general and more particularly, to a method and an apparatus for distinguishing ultrasound signals returned from a fluid from ultrasound signals due to noise.

BACKGROUND OF THE INVENTION

Doppler ultrasound has been used for many years to measure the flow rate of fluids. These fluids can reflect sound energy and shift the frequency of this sound in a direction and by an amount proportional to the direction and velocity of movement of the fluid relative to an ultrasound transducer. A detailed explanation of Doppler ultrasound techniques can be found in a number of publications, including P. T. Wells and R. Skidmore, "Doppler Developments in the Last Quinquenium," *Ultrasound in Medicine and Biology,* 11:p.613:623, 1985.

When a reflected frequency modulated ultrasound signal is received, it is typically converted to a lower frequency, e.g. d.c., to remove the carrier and provide an audio baseband signal. The baseband signal is then digitized. A spectrum analyzer is used to obtain the Fourier transform of the digitized baseband signal for producing a spectrum of the power at each frequency therein. The spectrum, which contains both positive and negative frequency components corresponding to changes in the velocity of the fluid flow in a forward and a reverse direction, is then used to distinguish flow towards the transducer from flow away from the transducer.

Referring to FIGS. 1 and 2, there is shown, respectively, a typical power spectrum output from a spectrum analyzer for cases of forward fluid flow (flow toward the transducer) and reverse fluid flow (flow away from the transducer). Forward flow corresponds to signal energy in the positive frequency portion of the power spectrum; i.e., the signal to the right of the vertical center line in FIGS. 1 and 2. Similarly, reverse flow is represented by the negative frequency portion of the power spectrum—the signal to the left of the center line in FIGS. 1 and 2. The amplitude of the power spectrum at each frequency corresponds to the percentage of the total volume of fluid flowing at a particular velocity.

For example, as shown in FIG. 1, the highest percentage of the total volume of fluid is flowing toward the transducer at a velocity corresponding to a frequency f2 and an approximately equal percentage of the total volume of fluid is flowing toward the transducer at a velocity corresponding to the frequency f1. Frequencies f3 and f4 both represent reasonable estimates of the edge dividing Doppler signal from background noise. The statistical nature of the background noise makes the exact position of the edge somewhat ambiguous. As will be seen, the subject invention exploits the statistical nature of the edge in order to improve its estimation. In FIG. 2, the highest percentage of the total volume of fluid is flowing away from the transducer at a velocity corresponding to the frequency f5. The edge between signal and noise in the reverse direction is represented by frequency f6.

The spectrum to the left of the centerline and to the right of f3 (or f4, if f4 is considered the edge) in FIG. 1 is mainly noise. The spectrum to the right of the centerline and to the left of f6 in FIG. 2 is mainly noise.

Spectral distributions such as FIG. 1 or FIG. 2 represent the Doppler signal, and hence the flow of the fluid, during a brief (approximately 10 ms) interval. A Doppler ultrasound apparatus shows the dynamic behavior of the fluid by displaying many, perhaps 100, such spectral distributions, called "frames", every second. FIG. 3 shows a curve of the most likely positions of the edge frequency as a function of time. Time proceeds along the horizontal (x) axis. Doppler frequency (and hence velocity of the fluid) proceeds along the vertical (y) axis. In the preferred embodiment, the Doppler ultrasound apparatus uses a color monitor to display information. The percentage of the total volume of fluid flowing at a particular velocity is represented by different colors of the display at that particular time and velocity. Brighter color represent relatively larger volume of flow at that velocity. FIG. 3 shows the edge rising and falling, in this case, with the cardiac cycle. As the heart contracts, the moves faster and the Doppler frequency shift increases. As the heart relaxes, the fluid moves more slowly and the Doppler frequency shift decreases.

It can be seen from FIGS. 1 and 2 that the exact positions of the edges are somewhat ambiguous as a result of the statistical nature of the background noise. Further, in typical situations, it is necessary to determine the edges of many spectral distributions in a short time. Thus, it is desirable to have a method and an apparatus which can estimate edges accurately and efficiently.

The power spectrum output from a spectrum analyzer is typically divided into frequency bins. A method that is currently used in a Doppler ultrasound apparatus starts at the highest frequency bin and iterates downward. The edge is the first bin that is both (1) greater than a threshold parameter "noise" and (2) that bin, plus the next n (where n could be 3), add to more than m (where m could be 4) times the noise parameter. An algorithm, in pseudo code form, using this method is shown below:

```
for each bin, from highest frequency down to centerline+1
{
    if (bin < noise) continue;

Add this bin and the next 3 bins into bin_sum.
    if(bin_sum > 4*noise)
    {    Call this bin the edge;
         exit;
    }
}
Call(centerline+1) the edge.
```

There is a similar method which finds negative edges by looking from the most negative bin toward the baseline in the same way as described above.

A similar algorithm was also described in T. D'Alessio "'Objective' Algorithm for Maximum Frequency Estimators in Doppler Spectral Analyzers," *Medical and Biological Engineering and Computing,* 23:p.63:68, 1985). Both algorithms (i.e., the algorithm described above in pseudo code form and D'Alessio's algorithm) start at the highest frequency and move a small "window" downward. The first algorithm predicts that the "edge" has been found when the average signal in the window is higher then the threshold parameter noise. D'Alessio predicts that the "edge" has been found when the values of r out of m in the window are higher than a threshold parameter.

D'Alessio, in the same paper, proposes a method for determining the threshold parameter. The threshold is defined to be an arbitrarily chosen number of dB below the maximum signal strength. D'Alessio simply asserts that r,m set to (2,2) works well. However, D'Alessio's method does not seem to be based on sound statistical principles.

SUMMARY OF THE INVENTION

In view of the foregoing, principal objects of the present invention are a method and an apparatus using Doppler techniques for mechanically and automatically distinguishing fluid flow signal from noise. The noise is generated by the ultrasound background (scattering) and the electronic noise.

Careful analysis of range gated, pulsed Doppler ultrasound signals returned from blood flowing through human cerebral arteries yields a mathematical model of the signal and of the background noise. It is found that the ultrasound background and electronic noise have the characteristics of a white Gaussian spectral distribution and the mean noise can be characterized as a constant. A statistical technique known as "maximum likelihood estimation" is applied to the model and from that application a "likelihood function" is derived. FIG. 4 shows a typical likelihood function. The horizontal (x) axis represents the possible flow velocities. The vertical (y) axis represents the relative probability (likelihood) that a given frequency is indeed the edge frequency. Referring to FIG. 4, frequency f1 and frequency f2 have approximately equal likelihood of being the edge frequency. Frequency f3 has a higher probability of being the edge frequency than either frequencies f1 or f2, and indeed, higher probability than any other frequency. In FIG. 4, frequency f3 is the most likely to be the edge frequency.

The likelihood function of a preferred embodiment requires two parameters, $\alpha$ and Z. $\alpha$ is an estimate of the noise power of the system. Z is an estimate of the Doppler signal strength, in units of $\alpha$. The $\alpha$ parameter can be estimated by evaluating the average signal power in many rectangular regions of relatively high velocity and the rectangle having the lowest average signal power is chosen as the estimate of $\alpha$. The Z parameter can be estimated by determining the average power (in units of $\alpha$) of bins having or around the strongest power.

As we have seen in FIG. 1, the statistical nature of the edge estimation undertaking introduces uncertainty as to the precise edge velocity of any single spectral frame. The present invention further uses one or more filters which refine the edge velocity estimate of a particular spectral frame by using information from preceding and succeeding frames.

The present invention produces an estimate of the edge velocity superior to prior art in its sensitivity to weak signals and absence of any need for fine-tuning during operation.

The above and other features and advantages of the present invention will become apparent from the following detailed description of the invention together with the accompanying drawings.

DETAILED DESCRIPTION OF A PREFERRED EMBODIMENT

The present invention comprises novel edge frequency detection systems and methods. The following description is presented to enable any person skilled in the art to make and use the invention. Descriptions of specific applications are provided only as examples. Various modifications to the preferred embodiments will be readily apparent to those skilled in the art, and the general principles defined herein may be applied to other embodiments and applications without departing from the spirit and scope of the invention. Thus, the present invention is not intended to be limited to the embodiments shown, but is to be accorded the widest scope consistent with the principles and features disclosed herein.

Figure 1:
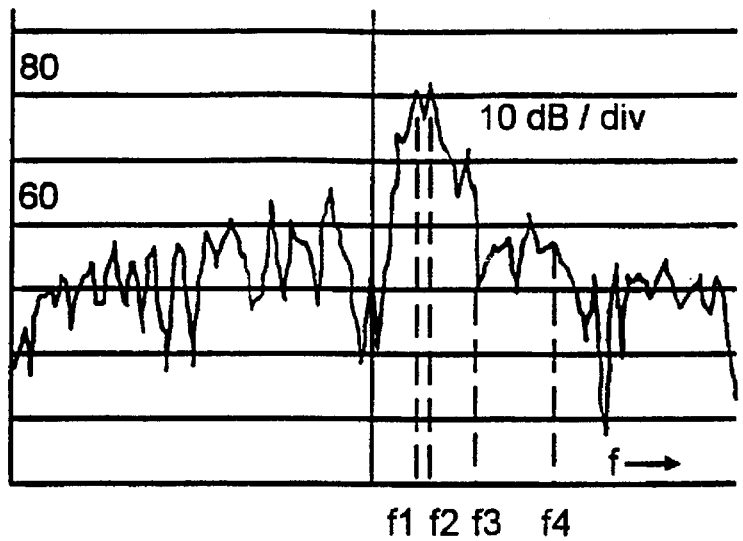
FIG. 1 is a typical power spectrum of fluid flow toward a Doppler transducer.
Figure 2:
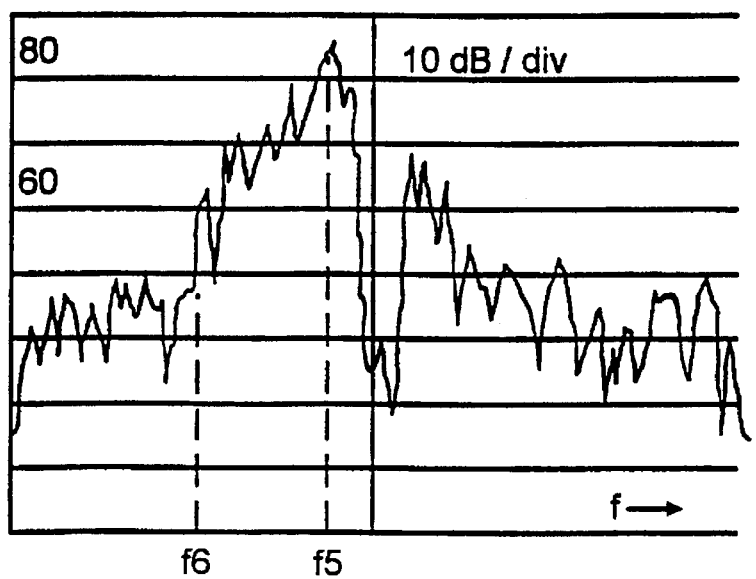
FIG. 2 is a typical power spectrum of fluid flow away from a Doppler transducer.
Figure 3:
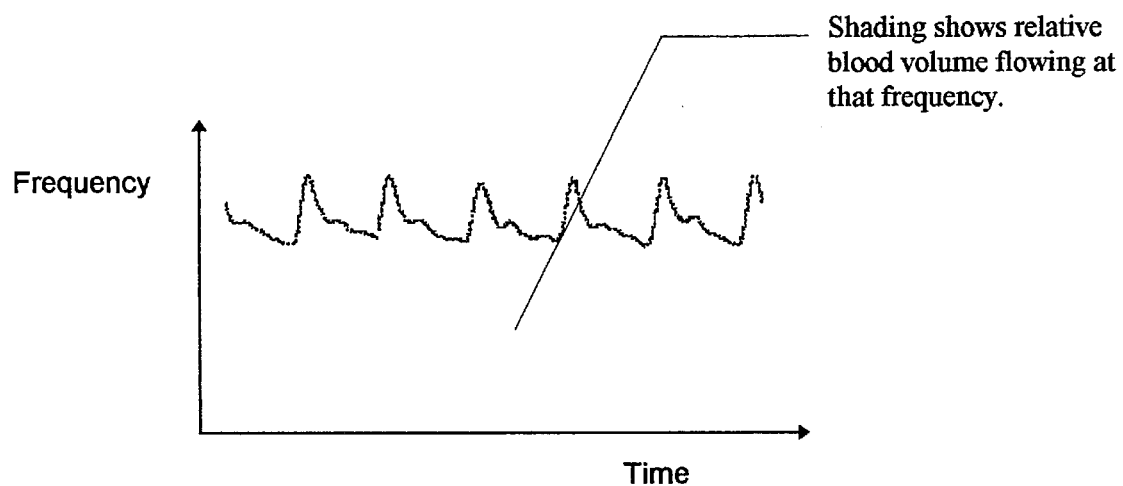
FIG. 3 is a typical dynamic display of time-evolving power spectra.
Figure 4:
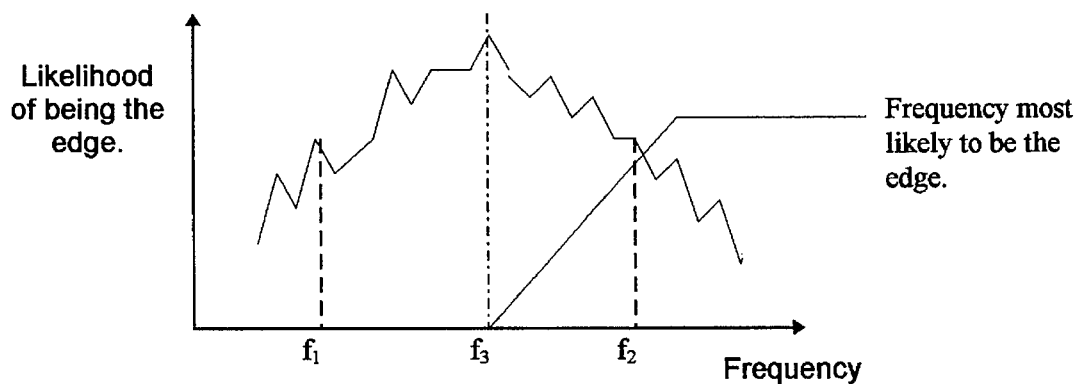
FIG. 4 is a typical likelihood function.
Figure 5:
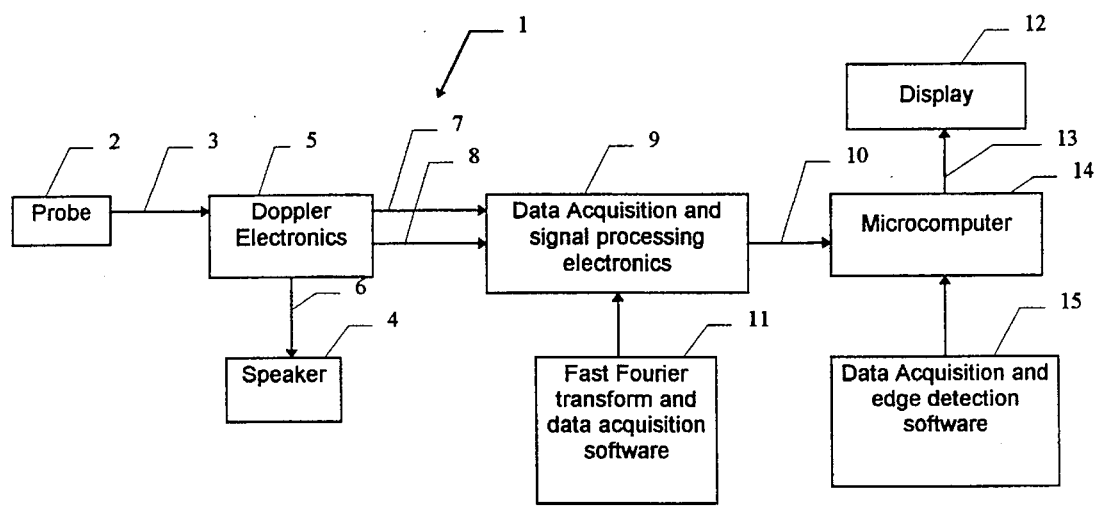
FIG. 5 is a block diagram of the apparatus according to the present invention.

Referring to FIG. 5, there is provided in accordance with the present invention a block diagram of an edge detection apparatus designated generally as 1. In the apparatus 1 there is provided a Doppler probe 2 and a speaker 4. The probe 2 and the speaker 4 are coupled to data acquisition and signal processing electronics designated generally as 5 by means of a plurality of signal lines 3 and 6. The output of Doppler electronics 5 is coupled to data acquisition and signal processing electronics designated generally as 9 by means of a pair of signal lines 7 and 8. The output of the electronics 9 is coupled to a microcomputer 14 by means of a signal line 10. A display 12 is coupled to the microcomputer 14 by means of a signal line 13. The electronics 9 are programmed by spectral estimation and data acquisition software designated generally as 11 and the microcomputer 14 is programmed with data acquisition and velocity edge recognition software designated generally as 15. Software 15 contains the inventive algorithm together with codes of a conventional nature.

The microcomputer 14 comprises, for example, a standard 486 PC such as the Dell Dimension 466D available from Dell Computer Corporation, Austin Tex. The Doppler electronics 5 comprises Neuroguard circuit cards from a standard Neuroguard Transcranial Doppler (TCD) unit available from MedaSonics, Inc. of Fremont, Calif. Specifically, the circuit cards comprise Doppler front end boards Part Nos. 109-0226-040 and 109-0226-050 and a Doppler control boards Part Nos. 109-0233-010 and 109-0239-010. The data acquisition and signal processing electronics 9 comprises a DSP (Digital Signal Processing) board Part No. 109-0228-010.

In operation with a number of patients and under a number of signal conditions, a standard Neuroguard Transcranial Doppler (TCD) was used to collect blood flow signals from various cerebral arteries. As shown in apparatus 1 of FIG. 5, the probe output was then fed into the Doppler electronics 5 comprising the above-identified Doppler front end board, Doppler control board, and DSP board. The boards convert the forward and reverse flow signals into quadrature signals I and Q which are output to the DSP board in the data acquisition and signal processing electronics 9. The abovedescribed software which is provided for the electronics 9 converts the analog I and Q quadrature signals into digital form at a 10.8 kHz rate, simultaneously sampling both quadrature channels. The data is then collected by the microcomputer 14 and analyzed for the velocity edge in real time.

Obtaining the Likelihood Function

It is desirable to be able to determine the location of an edge in the spectrum of the data collected using apparatus 1. Due to the presence of noise, it is very difficult to determine the exact location of the edge using visual inspection. Instead, a statistical analysis needs to be performed to find the maximum likelihood estimation of the edge. Let $M(v, i_E)$ be the likelihood function of the observed samples $v_i$, i=1 . . . $i_{max}$ if the edge location were i=$i_E$. Here v=($v_1$, . . . , $v_{imax}$) and $i_E$ is a possible edge location; $i_E$ has any value in the range $1 \leq i_E \leq i_{max}$. The maximum likelihood estimate of $i_E$ is that value where M attains its maximum value with respect to $i_E$.

In order to derive a likelihood function, it is necessary to develop a mathematical model for both the signal and the noise. Based on detailed analysis of many sets of ultrasound data collected using the edge detection apparatus 1 of FIG. 5, it is found that the following model allows an accurate and efficient estimation to be made:

(a) the underlying signal and noise random processes are Gaussian;

(b) the mean noise is constant; and (c) the signal is a step function at $i_E$.

Figure 11:
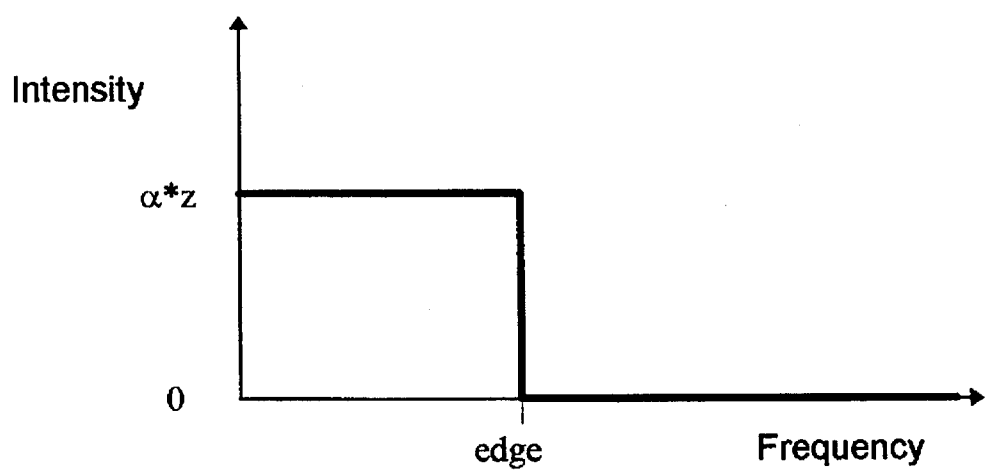
FIG. 11 shows the preferred signal model before being combined with Gaussian noise.

FIG. 11 shows the preferred signal model. The noise is added to this signal model to form the final model.

The above model can then be used to derive a maximum likelihood function using techniques known in the art, such as those described in A. Papoulis, *Probability, Random Variables, and Stochastic Processes,* McGraw-Hill, New York, N.Y., (1991). The following is a description of the application of the above model of ultrasound data to obtain a maximum likelihood function.

(a) The underlying signal and noise random processes are Gaussian. Therefore, the complex FFT samples are Gaussian and statistically independent from bin to bin. since the samples $v_i$, i=1 . . . , $i_{max}$ are the squared magnitudes of the complex FFT samples, the $v_i$ are mutually independent and negative-exponentially distributed with joint probability density function (pdf).

$$p(\underline{v}) = \prod_{i=1}^{i_{max}} \frac{1}{\bar{s}_i + \bar{n}_i} \exp\left[\frac{-v_i}{\bar{s}_i + \bar{n}_i}\right]$$

(b) The mean noise is constant, $$\bar{n}_i = \alpha \text{ all } i$$

Thus, $p(\underline{v})$ takes the form $$p(\underline{v}) = \prod_{i=1}^{i_{max}} \frac{1}{\alpha(1 + \bar{s}_i)} \exp\left[\frac{-v_i}{\alpha(1 + \bar{s}_i)}\right]$$

(c) The signal is a step function at $i_E$:

$$\bar{s}_i = 0 \quad i < i_E$$
$$= \alpha Z \quad i \geq i_E$$

where Z is the height of the step in units of average noise power per bin. Here the step is placed at a hypothetical value $i_E$.

By incorporating these three elements of the model into conventional statistical techniques relating to derivation of a likelihood function, it is possible to derive the following preferred likelihood function:

$$M(\underline{v}, i_E) = \frac{Z}{1 + Z} \sum_{i=i_E}^{i_{max}} v_i - \alpha \ln(1 + Z)(i_{max} - i_E + 1)$$

The edge detection apparatus 1 computes the value of this likelihood function for every velocity in a given spectral frame. The velocity for which the likelihood function is maximum is the velocity most likely to be the edge velocity. This velocity is referred to as the "raw edge".

Estimation of alpha and Z

The Maximum Likelihood Estimation edge algorithm is a parametric procedure requiring two input values, $\alpha$ and Z. The $\alpha$ parameter is an estimate of the noise background per bin in the absence of any blood flow information. The Z parameter is the height of the step function of FIG. 11, in units of the local value of $\alpha$. These two parameters are substituted into the above derived likelihood function.

Figure 9:
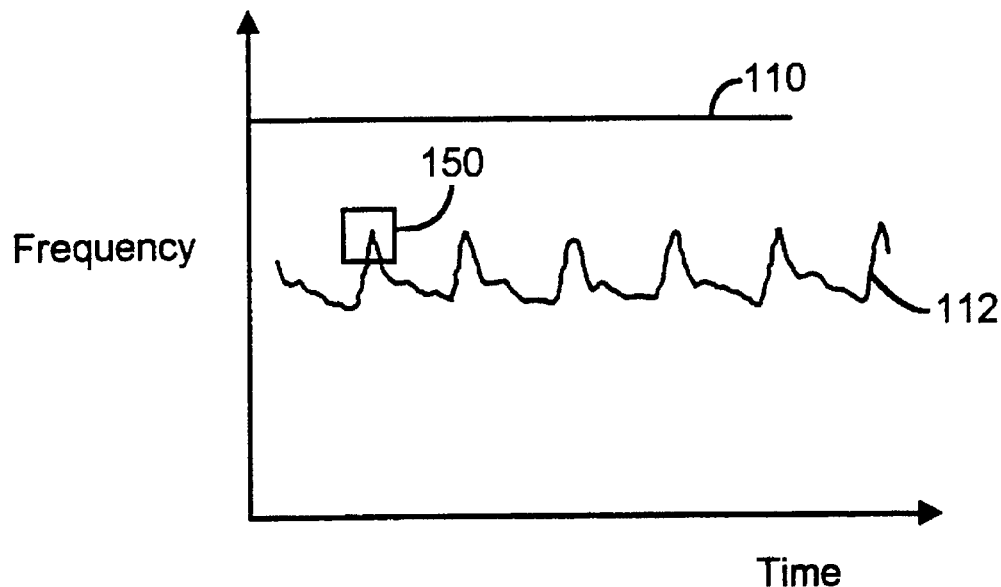
FIG. 9 shows the $\alpha$ estimator evaluating a region of the display which does not represent background noise.

The algorithm for estimating $\alpha$ exploits the fact that higher velocity flows are pulsatile, that is, the fluid moves faster, then slower, during the cardiac cycle. FIG. 9 shows the dynamic behavior of the spectral distribution of a typical blood flow for several cardiac cycles. The horizontal axis designates time and the vertical axis designates frequency (which corresponds to fluid velocity using standard Doppler formula). As explained above, edge detection apparatus 1 is able to measure frequency up to a maximum value $f_{max}$, and the frequency range from 0 to $f_{max}$ is divided into bins (in one embodiment, 128 bins). In FIG. 9, a line 110 is used to designate the maximum frequency. All the bins in the region below line 110 are associated with spectral power of a combination of signal and noise. A curve 112 shows the frequency, as a function of time, where pure noise ends and blood flow signal. Bins above curve 112 are those having higher frequency but likely to have lower (or absent) signal power. Similarly, bins below curve 112 are those having lower frequency and likely to contain signal power.

As indicated above, the $\alpha$ parameter is an estimate of the background noise per bin in the absence of any blood flow information. The blood only flows at the higher velocities under the momentary pressure of the contraction of the heart. Therefore we can depend on the signal being absent from the higher frequency when the heart relaxes during the cardiac cycle. This fact will be exploited in step two of the estimation for the $\alpha$ parameter, the details of which will be described below.

Figure 10:
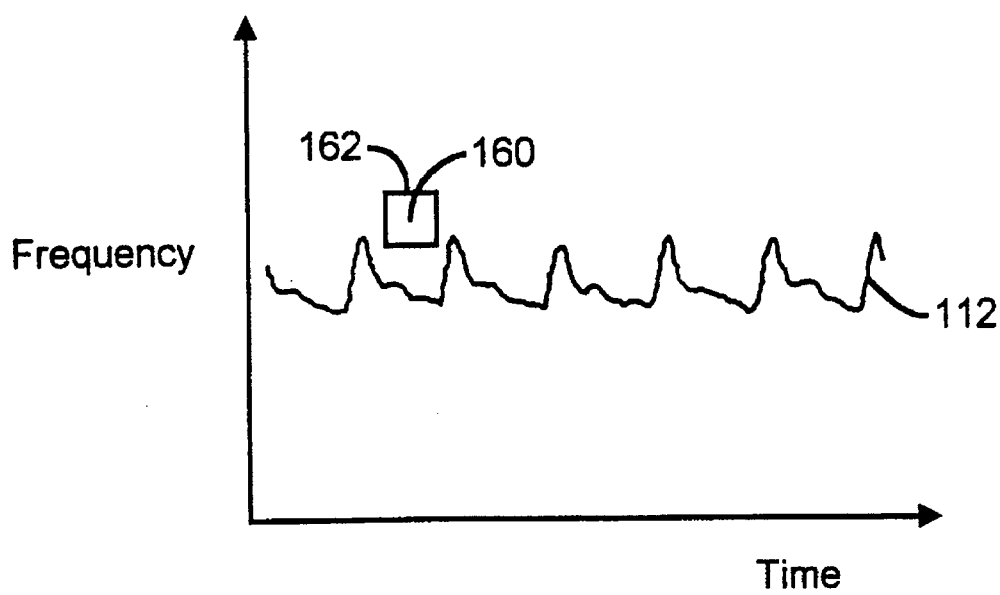
FIG. 10 shows the $\alpha$ estimator evaluating a region of the display which does represent background noise.

The first step to estimating $\alpha$ is to evaluate the average signal power in many rectangular regions of relatively high velocity (i.e., frequency). FIG. 9 shows such a region enclosed by a rectangle 150; however, this region overlaps curve 112, which contains signal information. Because of the presence of signal, rectangle 150 of FIG. 9 yields a poor estimate of the background noise. On the other hand, FIG. 10 shows a region, enclosed by a rectangle 160, without overlapping curve 112. Thus, rectangle 160 of FIG. 10 yields a good estimate of the background noise.

As indicated in FIG. 10, the size of rectangle 160 should be large enough to give a statistically significant estimate of the noise power in that region, but small enough to fit between successive signal peaks. In the preferred embodiment, the top boundary 162 of rectangle 160 coincides with the bin of the highest frequency. The other boundaries of rectangle 160 are chosen such that they fit between the peaks of two cardiac cycles and are located at sufficient distance from curve 112.

The second step in the estimation of $\alpha$ is to examine all the rectangles calculated for every frame over a period of time T. Some of the rectangles may have overlapped curve 112 of FIG. 10. These will have large values of signal power. The rectangle having the lowest signal power is the least likely to have overlapped curve 112. Therefore, the lowest average signal power of all the rectangles is chosen as the estimate of the parameter $\alpha$.

The time T should be chosen to be longer than worst-case width of the higher velocity portion of the signal, but short enough to be responsive changes in conditions. In one embodiment, the value of T is 560 ms, but may range from 250 ms to 2 seconds or longer.

The estimation of the Z parameter is now described. As indicated in FIG. 11, the signal model for the algorithm assumes that the signal is a step function of a certain magnitude above the noise background. In the preferred embodiment, the algorithm for determining Z is as follows:
(a) Search for the bin having the strongest power.
(b) Calculate the average power of a number of bins at either sides of the bin having the strongest power. In one embodiment, this number is three (i.e., a total of six bins are used in the calculation).
(c) Z is equal to the above calculated average power divided by $\alpha$.

Instead of using the above algorithm, it is possible to determine Z based solely on the bin having the strongest power, or on all the bins described above (i.e., the strongest bin and the six adjacent bins).

The values of $\alpha$ and Z are then passed to the likelihood function $M_{(v,iE)}$.

It should be appreciated that it is possible to derive a likelihood function having more than two parameters.

Refining the edge estimate through digital filtering

Figure 6:
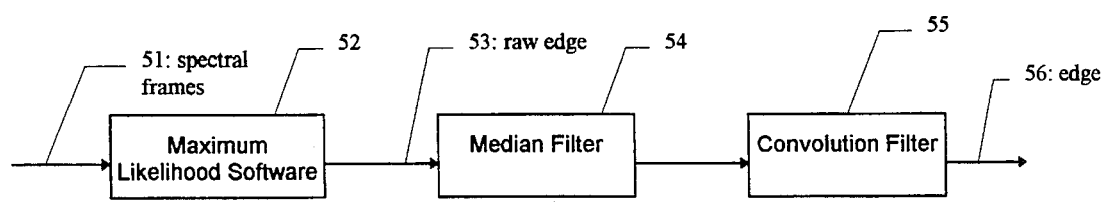
FIG. 6 is a data flow diagram showing the three components of the edge detection system.
Figure 7:
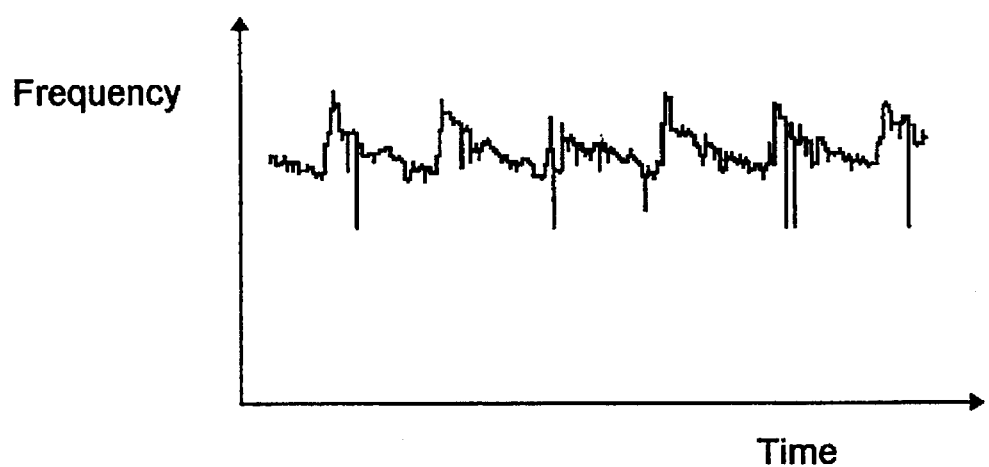
FIG. 7 shows the raw output of the edge detection apparatus before filtering

The results of the most likely edge frequency of the consecutive spectral frames, as estimated using the above described maximum likelihood estimation, gives a rather jagged edge (displayed as a function of time, along the x axis), as shown in FIG. 7. FIG. 7 shows that it may be difficult to use a typical raw edge signal to determine the edge. Consequently, the raw edge needs further signal processing in order to accurately determine the real flow profile. This signal processing is shown in the data flow diagram of FIG. 6. Incoming spectral frames 51 are first processed by the maximum likelihood software 52. This produces the raw edge 53 which fed into the median filter 54 and convolution filter 55.

Figure 8:
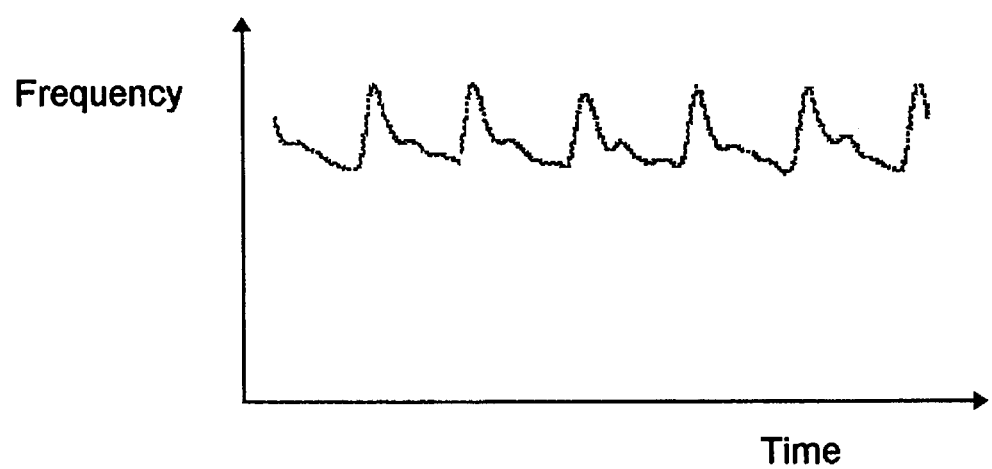
FIG. 8 shows the output of the edge detection apparatus after filtering.

The median filter 53 is applied to n (usually 3) consecutive edge frequencies. This filter greatly reduces unwanted spikes in the spectrum. The convolution filter 55 is a moving average in the preferred embodiment. Other convolutions, such as a least square filter, may be used to trade off between edge smoothness and compliance with sharp peaks. FIG. 8 shows a typical smoothed signal.

Prior art methods (e.g. D'Alessio's method) differ from that of the present invention in the following critical ways. Firstly, prior art methods do not use likelihood algorithms. Secondly, prior art methods only use a limited number of spectral bins of the FFT to determine the location of the edge frequency. Thus, prior art methods only use a local region in a given time while the present invention uses all the bins to identify the most likely edge location.

While preferred embodiments of the present invention are described above, it is contemplated that various modifications may be made thereto without departing from the spirit and scope of the present invention. For example, the above-described signal model of a step function which changes value from 0 to Z at the edge velocity is chosen because it worked best in statistical simulations of edge detection. This signal model might be changed from a step function to a ramp or a piece-wise linear function or to any other function intended to model the velocity distribution of the fluid being measured. Similarly, the above described convolution coefficients and median filtering may be altered in order to produce the desired tradeoff between edge smoothness and compliance with sharp peaks. The $\alpha$ estimator described above may use a wide range of rectangle sizes and time periods T. Accordingly, it is intended that the embodiments described be considered only as an illustrative of the present invention and that the scope thereof should not be limited thereto but be determined by reference to the claims hereinafter provided and their equivalents.

What is claimed is:

1. A method for automatically determining edge frequency associated with velocity of a fluid, said velocity being a function of time, said method comprising the steps of:

measuring ultrasonic signal generated by said fluid as a function of time, said ultrasonic signal containing background noise and Doppler signal associated with said velocity;

generating sets of discrete spectral components from said ultrasonic signal, each set associated with said ultrasound signal in a distinct time interval;

determining, based on selected members of said sets of discrete spectral components, a first parameter associated with said noise;

determining, based on selected members of said sets of discrete spectral components, a second parameter associated with said Doppler signal;

determining an edge frequency for one of said sets of discrete spectral components based on said first and said second parameters and said discrete spectral components of said one set; and repeating said step of determining edge frequencies for substantially all said sets.

2. The method of claim 1 further comprising a step of filtering at least a portion of said edge frequencies.

3. The method of claim 2 wherein said filtering step comprises a step of forming a median filter.

4. The method of claim 2 wherein said filtering step comprises a step of forming a convolution filter.

5. The method of claim 1 wherein said first parameter is determined based on said noise being a random process having a Gaussian distribution.

6. The method of claim 5 wherein said step of determining said first parameter comprises the steps of:

selecting a plurality of regions from said sets of discrete spectral components having high frequency; and identifying said first parameter as the average value of one of said regions having the lowest spectral power.

7. The method of claim 6 wherein said fluid is driven by a pulsating source such that said velocity is substantially periodic having a predetermined period, said step of selecting a plurality of regions comprising the step of selecting regions which fit within said predetermined period.

8. The method of claim 1 wherein said second parameter is determined based on said Doppler signal being a step function.

9. The method of claim 8 wherein said step of determining said second parameter comprises the steps of:

selecting a plurality of discrete spectral components from said sets of discrete spectral components having substantially the highest spectral power; and identifying said second parameter as the average value of at least a portion of said plurality of discrete spectral components.

10. The method of claim 9 wherein said portion does not include the discrete spectral component having the highest spectral power.

11. The method of claim 1 wherein said step of determine said edge frequency comprises the steps of:

forming a likelihood function having at least said first and said second parameters as input parameters; and identifying said edge frequency as a maximum value of said likelihood function.

12. The method of claim 5 wherein said likelihood function is:

$$M(\underline{v}, i_E) = \frac{Z}{1+Z} \sum_{i=i-i_E}^{i_{max}} v_i - \alpha \ln(1+Z)(i_{max} - i_E + 1)$$

where $\alpha$ is said first parameter, $v_i$ represents said set of discrete spectral component, Z is said second parameter and $i_E$ is said edge frequency.

13. An apparatus for automatically determining edge frequency associated with velocity of a fluid, said velocity being a function of time, said apparatus comprising:

an ultrasonic probe for measuring ultrasonic signal as a function of time, said ultrasonic signal containing background noise and Doppler signal associated with said velocity;

a spectrum analyzer, coupled to said probe, for generating sets of discrete spectral components from said ultrasonic signal, each set corresponding to a distinct time interval; and a data processing device for identifying a discrete spectral component in each of said sets as said edge frequency separating said Doppler signal from said background noise, said data processing device comprising:

a first routine for determining, based on said discrete spectral components, a first parameter associated with said noise;

a second routine for determining, based on said discrete spectral components, a second parameter associated with said Doppler signal; and a third routine for determining edge frequencies for substantially all said sets of discrete spectral components, said third routine containing means for determining said edge frequency for one set of discrete spectral components, based on said first and said second parameters and said discrete spectral components in said one set.

14. The apparatus of claim 13 further comprising a fourth routine for filtering at least a portion of said edge frequencies.

15. The apparatus of claim 14 wherein said fourth routine comprises a median filter.

16. The apparatus of claim 14 wherein said fourth routine comprises a convolution filter.

17. The apparatus of claim 13 wherein said third routine further comprises a likelihood function containing at least said first and said second parameters as input parameters, said edge frequency being a maximum value of said likelihood function.

18. The apparatus of claim 12 wherein said likelihood function is:

$$M(\underline{v}, i_E) = \frac{Z}{1+Z} \sum_{i=i-i_E}^{i_{max}} v_i - \alpha \ln(1+Z)(i_{max} - i_E + 1)$$

where $\alpha$ is said first parameter, $v_i$ represents said set of discrete spectral component, Z is said second parameter and $i_E$ is said edge frequency.

19. The apparatus of claim 13 wherein said first parameter is determined based on said noise being a random process having a Gaussian distribution.

20. The apparatus of claim 13 wherein said second parameter is determined based on said Doppler signal being a step function.

21. The apparatus of claim 13 wherein said first routine comprises means for selecting a plurality of regions from said sets of discrete spectral components having high frequency and wherein said first parameter is the average value of one of said regions having the lowest spectral power.

22. The apparatus of claim 13 wherein said second routine comprises means for selecting a plurality of discrete spectral components from said sets of discrete spectral components having substantially the highest spectral power and wherein said second parameter is the average value of at least a portion of said plurality of discrete spectral components.

23. The apparatus of claim 22 wherein said portion does not include the discrete spectral component having the highest spectral power.

* * * * *